United States Patent

Smrekar

[15] 3,662,084
[45] May 9, 1972

[54] VIBRATION DAMPER

[72] Inventor: Clarence E. Smrekar, Cleveland, Ohio

[73] Assignee: Preformed Line Products Company, Cleveland, Ohio

[22] Filed: Aug. 13, 1971

[21] Appl. No.: 171,697

[52] U.S. Cl. .................................. 174/42, 174/DIG. 12
[51] Int. Cl. ...................................................... H02g 7/14
[58] Field of Search ................................ 174/42, DIG. 12

[56] References Cited

UNITED STATES PATENTS

| | | | |
|---|---|---|---|
| 1,992,538 | 2/1935 | Monroe et al. | 174/42 |
| 2,959,632 | 11/1960 | Peterson | 174/42 X |
| 3,463,870 | 8/1969 | Eucker | 174/42 |

Primary Examiner—Laramie E. Askin
Attorney—James P. Hume et al.

[57] ABSTRACT

There is disclosed a vibration damper for an electrical transmission line or the like comprising a pair of weights supported at opposite ends of a rod and a pair of helically preformed dead-end appliances each having a pair of helical leg portions and an intermediate bight portion. One leg portion of each appliance is wrapped about the transmission line and the other leg of each appliance is wrapped about the rod, the appliances being applied so as to face in opposite directions with their respective bight portions overlapping to form a central loop.

8 Claims, 2 Drawing Figures

PATENTED MAY 9 1972 3,662,084

3,662,084

VIBRATION DAMPER

INTRODUCTION

The present invention relates to appliances for linear bodies and, more particularly, it is directed to new and improved apparatus for damping vibration of suspended linear bodies such as electrical transmission lines and the like.

SUMMARY OF THE INVENTION

The present invention is directed to apparatus for damping vibration of a suspended linear body. Specifically, the apparatus comprises rod means having first and second opposed end portions and a pair of weights coupled respectively to the first and second end portions of the rod means. A pair of helically preformed dead-end appliances each having a pair of helical leg portions extending in a like direction and an intermediate bight portion are also provided. One leg portion of each appliance is wrapped about the linear body and the other leg portion of each appliance is wrapped about the rod means, the appliances facing in opposite direction with respect to the bight portions thereof and overlapping to form a central loop portion.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawing in the several figures of which like reference numerals identify like elements and in which:

DESCRIPTION OF THE PREFERRED EMBODIMENT

Figure 1:
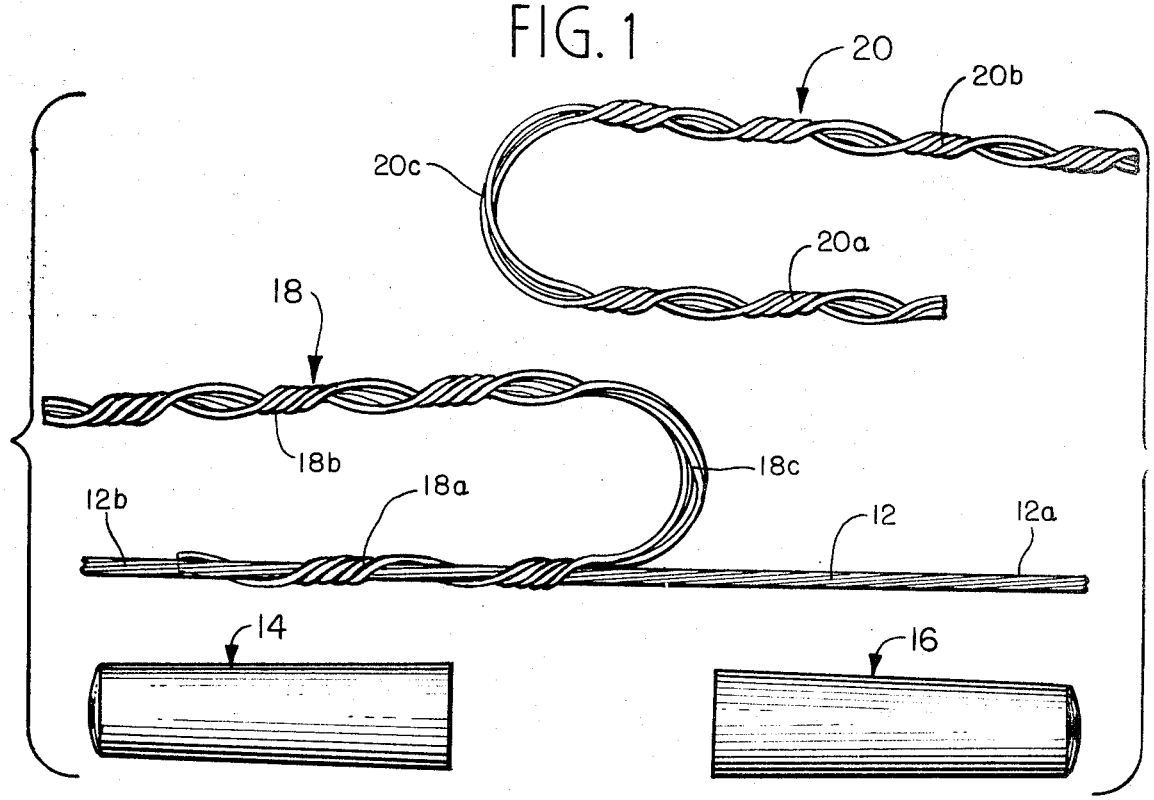
FIG. 1 is a side elevational view, partly in section, depicting the individual components of the vibration damping apparatus of the invention.

Referring now to FIG. 1, the individual components of the damping apparatus of the invention there illustrated comprise a rod means 12 having first and second opposed end portions 12a and 12b. The rod 12 may be composed of a stranded metal cable as illustrated or, alternatively, may be composed of a solid metal or even a suitable non-ferrous or plastic material. It is required only that the rod 12 have sufficient strength and resiliency to support a pair of weights 14, 16 which are secured to respective opposite end portions 12a and 12b of the rod. Although the illustrated weights 14 and 16 are of the conventional Stockbridge type, it will be understood that weights of other configurations and types may be used consistent with the present invention.

The apparatus also comprises a pair of helically preformed dead-end appliances 18 and 20 each having a pair of helical leg portions 18a, 18b and 20a, 20b as well as respective intermediate bight portions 18c and 20c. The helical dead-ends 18 and 20 may be of conventional and identical construction and may utilize the teachings of U.S. Pat. Nos. 2,761,273, 3,007,300, 3,080,631, 3,183,658, and 3,315,457 and further may be manufactured by any suitable method such as that disclosed in U.S. Pat. No, 2,691,865, all of the foregoing patents being assigned to the same assignee as the present invention. The interwound strands or elements of each appliance may be of any suitable material that has sufficient strength, resiliency and flexibility to meet the requirements of the environment. Generally, the appliance is composed of multiple strands or elements of aluminum, steel, or similar metals, although a single element construction of a molded plastic or the like may be used in appropriate circumstances. In the former case, the individual elements of the band may be secured, if desired, in their bridging relationship by means of an adhesive, solder, brazing compound or the like.

In accordance with conventional practice, the respective leg portions of the dead-end appliances 18 and 20 are preformed to have a pitch length sufficiently long so that they may be applied sideways to a linear body and then wrapped thereabout by rotating the legs around the body in the direction of propogation of the helices. The internal diameters of the helically preformed legs of each appliance are preferably somewhat less than the external diameter of the linear bodies about which they are wrapped so that they are forced to resiliently expand to accommodate the latter. However, the internal diameter of the helices should be sufficiently great so that the elastic limit of the material is not exceeded. In this manner, it is possible to achieve a tightly gripping relationship between the helices and the linear body about which they are wrapped and essentially preclude relative longitudinal movement therebetween.

In FIG. 1, one leg portion 18a of the appliance 18 is shown as applied in gripping relation about the rod member 12 with the leg portions of the appliance facing in a leftward direction and with the leg portion 18a spaced from the terminal portion 12b of the rod 12 to provide adequate space for securance of the weight 14 thereto. The leg portion 20a of the appliance 20 is applied about the rod 12 in a similar fashion except that the appliance 20 is oriented with its leg portions facing in a rightward direction and is positioned so that its bight portion 20c overlaps the bight 18c. It will also be noted that the leg portions 18a and 20a are of a shorter length than their respective counterparts 18b and 20b. The reason for this is to provide adequate space for securance of the weights 14 and 16 to a rod of moderate length as well as to assure that the appliance is adequately secured to the overhead conductor. It will be recognized by those skilled in the art, however, that under appropriate circumstances the legs of the appliances 18 and 20 may be of equal length.

Figure 2:
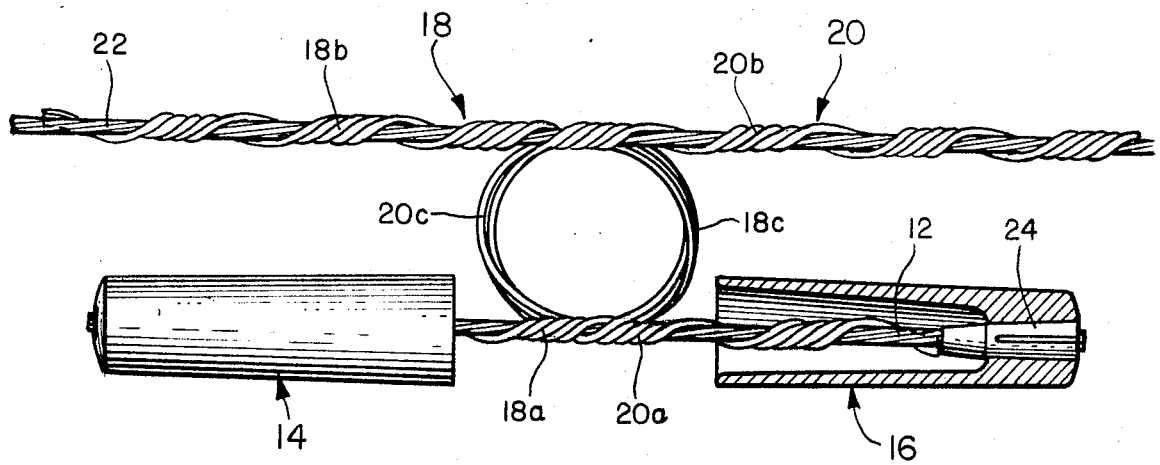
FIG. 2 is a side elevational view illustrating the apparatus of FIG. 1 as fully assembled and applied to an overhead conductor.

A more complete understanding of the apparatus of the invention may now be had by reference to FIG. 2 wherein the apparatus is depicted in a fully assembled condition and applied to an overhead conductor 22. As there shown, the weight 16 is at its forward end formed with an enlarged hollow portion or recess which terminates at the rearward end of the weight in a narrowed bore whereat the weight is secured to the terminal portion 12a of the rod 12. In this regard, the securance may be effected in a variety of conventional ways such as illustrated, for example, in U.S. Pat. No. 1,992,538. Specifically, as shown in the present illustration and the aforesaid patent, a tapered collet or sleeve 24 is snugly fitted over the end portion 12a of the rod 12. The collet 24 is preferably also provided with one or more radial slits which enables the collet to be compressed when it is slidably inserted into the tapered receiving bore in the end portion of the weight 16. It will, of course, be understood that the weight 14 is constructed and secured to the rod 12 in a like fashion.

As seen in FIG. 2, the bight portions 18c and 20c of the appliances overlap to form a generally O-shaped central loop. The bights 18c and 20c are overlapped with their contiguous portions counterphased such that the appliances interfit in noninterfering relationship when wrapped about the cable 22. For ease of installation, it is preferred that the rod 12, weights 14 and 16, and the helical appliances 18, 20 be preassembled. Hence, on site installation requires only that the respective leg portions 18b and 20b be wrapped about the conductor 22.

While a particular embodiment of the present invention has been shown and described, it is apparent that various changes and modifications may be made, and it is therefore intended in the following claims to cover all such modifications and changes as may fall within the true spirit and scope of this invention.

What is claimed is:

1. Apparatus for damping vibration of a suspended linear body, comprising:

rod means having first and second opposed end portions;

a pair of weights coupled respectively to said first and second end portions of said rod means; and a pair of helically preformed dead-end appliances each having a pair of helical leg portions extending in a like direction and an intermediate bight portion, one leg portion of each appliance being wrapped about said linear body and the other leg portion of each appliance being wrapped about said rod means, said appliances facing in opposite directions with the respective bight portions thereof overlapping to form a central loop portion.

2. The apparatus of claim 1 in which the helical leg portions of said appliances are of an internal diameter less than that of said linear body and said leg portions, respectively, for tightly gripping said rod means and said linear body.

3. The apparatus of claim 2 in which said bight portions of each appliance are generally U-shaped and in which said bight portions overlap to form a generally O-shaped loop.

4. The apparatus of claim 3 in which said rod means consists of a single rod segment.

5. The apparatus of claim 4 in which said damper weights are of the Stockbridge type.

6. The apparatus of claim 5 in which the leg portions of said helical appliances applied to said linear body are of a greater length than those applied to said rod segment.

7. The apparatus of claim 6 in which said helical appliances are identical and are each composed of multiple helical strands.

8. The apparatus of claim 7 in which said rod segment is of the same diameter as said linear body.

* * * * *